US011656606B2

(12) United States Patent
Phan et al.

(10) Patent No.: US 11,656,606 B2
(45) Date of Patent: May 23, 2023

(54) SITE-WIDE OPERATIONS MANAGEMENT OPTIMIZATION FOR MANUFACTURING AND PROCESSING CONTROL

(71) Applicant: International Business Machines Corporation, Armonk, NY (US)

(72) Inventors: Dung Tien Phan, Pleasantville, NY (US); Lam Nguyen, Ossining, NY (US); Pavankumar Murali, Ardsley, NY (US); Hongsheng Liu, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 16/998,642

(22) Filed: Aug. 20, 2020

(65) Prior Publication Data

US 2022/0057786 A1    Feb. 24, 2022

(51) Int. Cl.
| | |
|---|---|
| G05B 15/00 | (2006.01) |
| G05B 19/418 | (2006.01) |
| G06N 5/046 | (2023.01) |
| G06N 3/08 | (2023.01) |
| G06N 7/01 | (2023.01) |

(52) U.S. Cl.
CPC ......... *G05B 19/41835* (2013.01); *G06N 3/08* (2013.01); *G06N 5/046* (2013.01); *G06N 7/01* (2023.01)

(58) Field of Classification Search
CPC .............................................. G05B 19/41835
USPC ............................................................. 700/1
See application file for complete search history.

(56) References Cited

U.S. PATENT DOCUMENTS

| | | | |
|---|---|---|---|
| 7,801,710 B2 | 9/2010 | Sturrock et al. | |
| 8,676,726 B2 * | 3/2014 | Hore | G06N 5/02 706/12 |
| 10,416,662 B2 * | 9/2019 | Adendorff | G06F 11/0793 |
| 10,615,638 B1 * | 4/2020 | Trias | G01R 21/133 |
| 2009/0287320 A1 * | 11/2009 | MacGregor | G05B 17/02 700/29 |

(Continued)

FOREIGN PATENT DOCUMENTS

WO    WO-2020166453 A1 *  8/2020

OTHER PUBLICATIONS

Guo et al. "Prediction of effluent concentration in a wastewater treatment plant using machine learning models." Journal of Environmental Sciences 32 (2015): pp. 90-101.

(Continued)

*Primary Examiner* — Evral E Bodden
(74) *Attorney, Agent, or Firm* — Cantor Colburn LLP; Jared Chaney (57) ABSTRACT

Aspects of the invention include implemented method includes selecting an optimization algorithm for the control system of a processing plant based on whether the control system is guided by a linear-based predictive model or a non-linear-based predictive model, in which a gradient is available. Calculating set-point variables using the optimization algorithm. Predicting an output based on the calculated set-point variables. Comparing an actual output at the processing plant to the predicted output. Suspending a physical process at the processing plant in response to the actual output being a threshold value apart from the predicted output.

14 Claims, 5 Drawing Sheets

(56) References Cited

U.S. PATENT DOCUMENTS

2013/0069792 A1* 3/2013 Blevins .................. G06F 17/16
  703/2
2019/0179271 A1 6/2019 Modi et al.
2019/0188584 A1 6/2019 Rao et al.

OTHER PUBLICATIONS

Lahiri et al., "Soft sensor development and optimization of the commercial petrochemical plant integrating support vector regression and genetic algorithm." Chemical Industry and Chemical Engineering Quarterly 15.3 (2009): pp. 175-187.

Niu et al. "Comparison of multiple linear regression, artificial neural network, extreme learning machine, and support vector machine in deriving operation rule of hydropower reservoir." Water 11.1, 88 (2019): 17 pages.

Sarnovsky et al., "Big data processing and analytics platform architecture for process industry factories." Big Data and Cognitive Computing 2.1, 3 (2018): 15 pages.

Warsokusumo et al. "Optimization of Power Plant Operation Parameters for Efficiency Improvement through Data-Driven Relevance Vector Machine Regression Algorithm." 2018 International Conference on Applied Engineering (ICAE). IEEE, (2018) 5 pages.

* cited by examiner

SITE-WIDE OPERATIONS MANAGEMENT OPTIMIZATION FOR MANUFACTURING AND PROCESSING CONTROL

BACKGROUND

The present invention generally relates to programmable computing devices, and more specifically, to computing devices, computer-implemented methods, and computer program products configured to optimize operations management for manufacturing and processing control.

Large scale manufacturing and processing facilities use complex computer-based control systems to regulate the sub-processes and overall processes used to produce goods. A control system is a set of electronic and mechanical devices that monitor real-time data and regulate each sub-process of the production process. The control systems control the output of one sub-process to be an optimal input of one or more ensuing sub-processes. Sensors perform real-time monitoring of each input, sub-process mechanism, and output and provide the data to the control system. The control system monitors the sensor data and can causes modifications to the input or mechanisms if there is an issue with the output.

SUMMARY

Embodiments of the present invention are directed to a site-wide operations management optimization for manufacturing and process control. A non-limiting example computer-implemented method includes selecting an optimization algorithm for the control system of a processing plant based on whether the control system is guided by a linear-based predictive model or a non-linear-based predictive model, in which a gradient is available. Calculating a set variable using the optimization algorithm. Predicting an output based on the calculated set variable. Comparing an actual output at the processing plant to the predicted output. Suspending a physical process at the processing plant in response to the actual output being a threshold value apart from the predicted output.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products for optimizing a throughput production of each production facility of a network of production facilities.

Modern manufacturing and processing facilities are arranged as a network of remote plants, in which each plant completes a step towards converting raw materials into marketable products. Each plant in the network includes a self-contained set of inputs and outputs for each of the plant's sub-processes. The control systems use predictive models to guide the overall process by monitoring the relationship between various set-points (controllable variable values), material inflows, and throughput. For example, oil processing involves multiple remote facilities that each perform separate functions include separating residuals from crude oil, converting the residuals into marketable products, and treating the marketable products to remove any contaminants. The individual control systems use predictive models to determine an expected throughput from each oil processing facility and regulate the facilities based on a comparison of actual throughput to predicted throughput.

To ensure that the control systems produce the maximum amount of marketable products, large-scale optimization measures are implemented into the control systems. The large-scale optimization methods need to account for operational restrictions and non-linear relationships between inflows and outflows. Conventional optimization methods rely on industry-specific models that are too costly to be portable to other industries or, in some instances, unavailable. In some instances, conventional optimization models, are either implicitly defined or define processes as a black box. As a result of poor portability and black box approximations, the conventional optimization methods are unable to account for randomness in raw materials or unexpected breakdowns in a process.

One or more embodiments of the present invention address one or more of the above-described shortcomings by providing computer-implemented methods, computing systems, and computer program products to optimize the operation of a production plant of a multi-plant network. The optimization can be achieved by deriving optimal set-points and flows for an entire process, recasting the multi-plant network into a surrogate network of regression transformers that capture the essential process input to output relationships at each plant. The representation is coupled with operational constraints to develop a prediction-optimization formulation plant-wide optimization.

Figure 1:
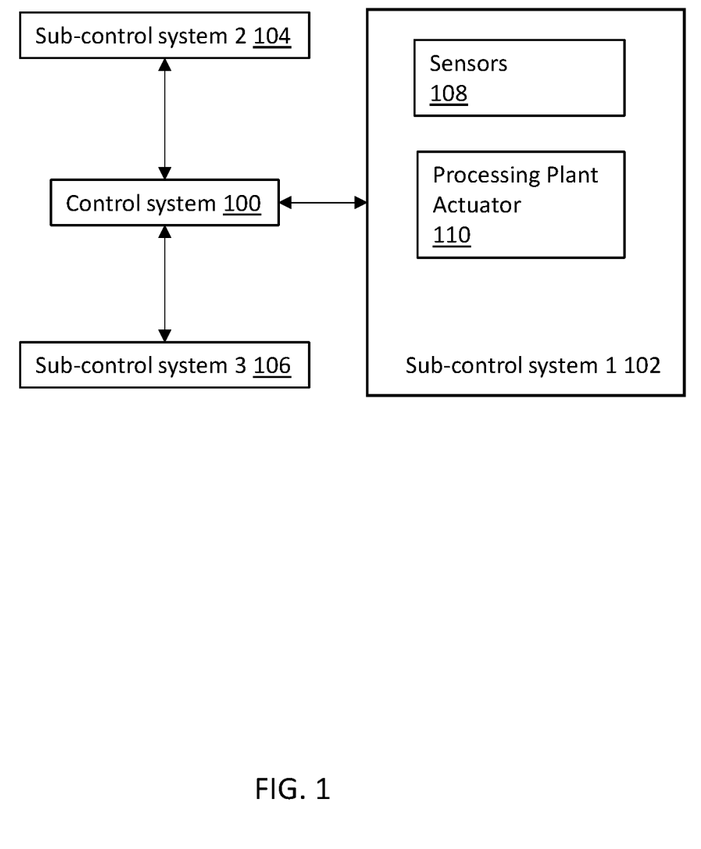
FIG. 1 illustrates a block diagram of components of a manufacturing and process control system in accordance with one or more embodiments of the present invention.

Turning now to FIG. 1, a manufacturing and process control system 100 is generally shown in accordance with one or more embodiments of the present invention. The control system 100 is a computer-based system that regulates the operation of connected electrical and mechanical devices via the use of feed-forward or feedback control loops. The control system 100 is operable to detect a predictive model type used by a sub-control system of a plant and determine the optimal set values based on the predictive model type. The control system 100 further monitors the inputs and outputs of the process performed at the plant, and adjusts the process based on not achieving the desired throughput. The control system 100 is in operable communication with a network of sub-control systems, in which each sub-control system is an overall control system of a processing plant of a network of processing plants. As illustrated, the control system 100 is in operable communication with a first sub-control system 102, a second sub-control system 104, and a third sub-control system 106. Each of the first, second, and third sub-control system 102 104 106 includes a respective fleet of sensors 108 and at least one actuator 110. The actuator 110 is operable to move or control a machine involved in at least one step of the process performed at the processing plant Furthermore, at least one sensor of the fleet of sensors 108 is operable for sensing and collecting data from the actuator 110 and transmitting the data back to the control system 100. It should be appreciated that although FIG. 1 illustrates three sub-control systems 102 104 106, the control system 100 can be in operable communication with any number of sub-control systems used to control a network of processing plants.

The control system 100 is in operable communication with each respective first, second, and third sub-control system 102 104 106 of each processing plant of the network of processing plants. Each of the first, second, and third sub-control systems 102 104 106 applies a predictive model (e.g., a regression model) to calculate a predicted throughout at the plant. For the purposes of explanation, the first sub-control system 102 is discussed herein. However, this discussion applies to any sub-control system of the network of processing plants. The first sub-control system 102 uses a predictive model, for example, a regression model to collect data from the processing plant and calculate the optimal throughput. The control system 100 can detect the type of predictive model used by the first sub-control system 102 and determine whether the predictive model is a linear-based predictive model or a gradient-based model. The control system 100 can detect the type of predictive model based on accessing a processing plant network database and read the type of predictive model. The control system 100 can also access the first sub-control system 102 and extract characteristics of the predictive model and compare the characteristics to a dictionary of predictive models.

Figure 3:
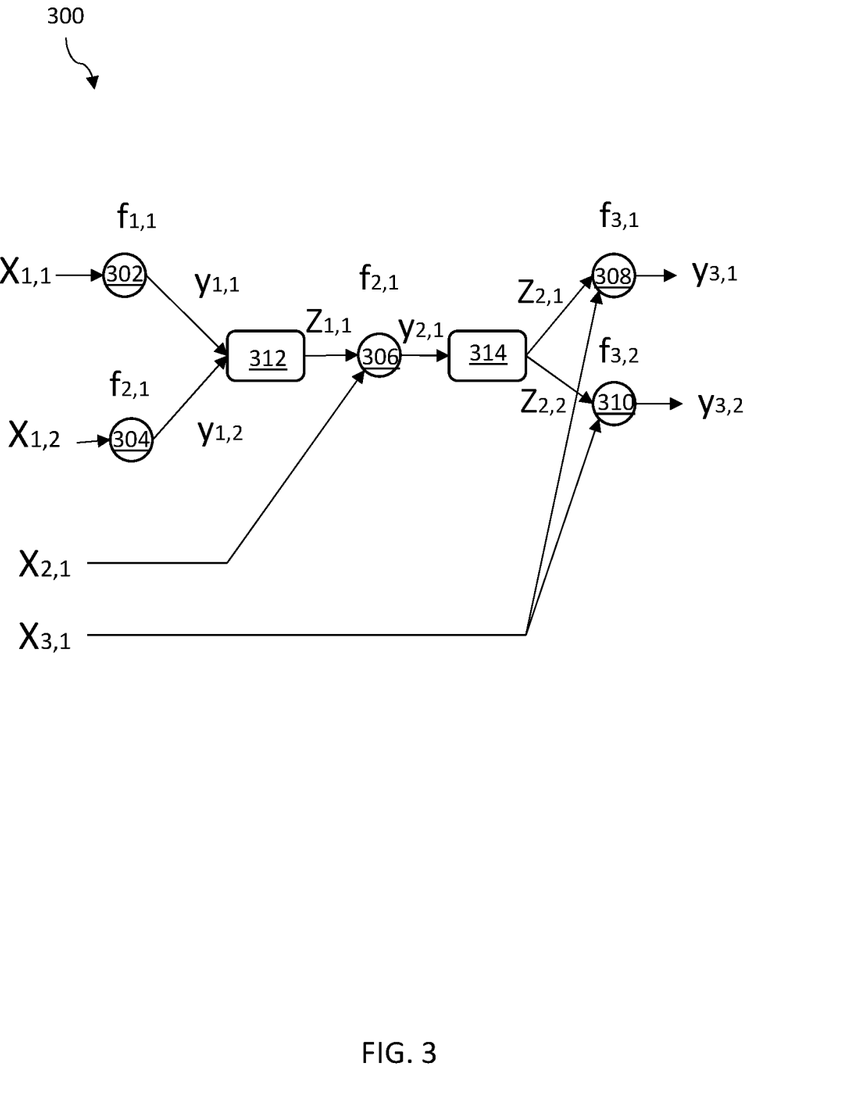
FIG. 3 illustrates an exemplary network representation of processing plants in accordance with one or more embodiments of the present invention.

For each the sub-control system, a prediction model is used to learn the relationship between the control variables and the output. Whether the sub-control system is applying a linear predictive model or a non-linear predictive model, the control system 100 can model the network of processing plants as follows (the model is illustrated in further detail at FIG. 3). As shown in FIG. 3, the plant is represented as a hierarchy structure with L layers having upstream-downstream operation relations. FIG. 3 is a feed-forward network representation for the plant. A circular node in a layer of the network represents a plant (i.e., a sub-system), where a regression function is built. A rectangular node represents all operational constraints such as maintaining inventory levels and limits on the adjustment of variables from the preceding time period. The relationship in these rectangular nodes are often linear.

The predictive model $f_l$ can be a linear-based predictive model or a highly non-linear-based predictive models, in which a gradient is available. The linear-based predictive model type can include linear-based regression functions, decision trees, piece-wise linear-based regression functions, gradient-boosted trees, multivariate adaptive regression splines (MARS), fully connected feed-forward network (FFN), and other similar models. The highly non-linear predictive model (gradient-based predictive model) can include deep neural networks (DNN), support vector machines (SVN), and other similar models. Regardless of the type of predictive model, the predictive model can be built through machine learning and executed on a neural network. The predictive model can be trained using industry-specific historical data.

The plant consists of a consecutive network of processes (e.g., sub-control systems), where processes at the l-th layer in FIG. 3 can be described by the following vector-valued regression function:

$$f_l:(z_{l-1}, x_l) \in \mathbb{R}^{k_{l-1}+m_l} \to y_l \in \mathbb{R}^{n_l}$$

where $x_l \in \mathbb{R}^{m_l}$ are the controllable variables (e.g., set-points) and $z_{l-1} \in \mathbb{R}^{k_{l-1}}$ are the uncontrollable variable (e.g., the inflow from a previous process or predecessor plant).

Figure 2:
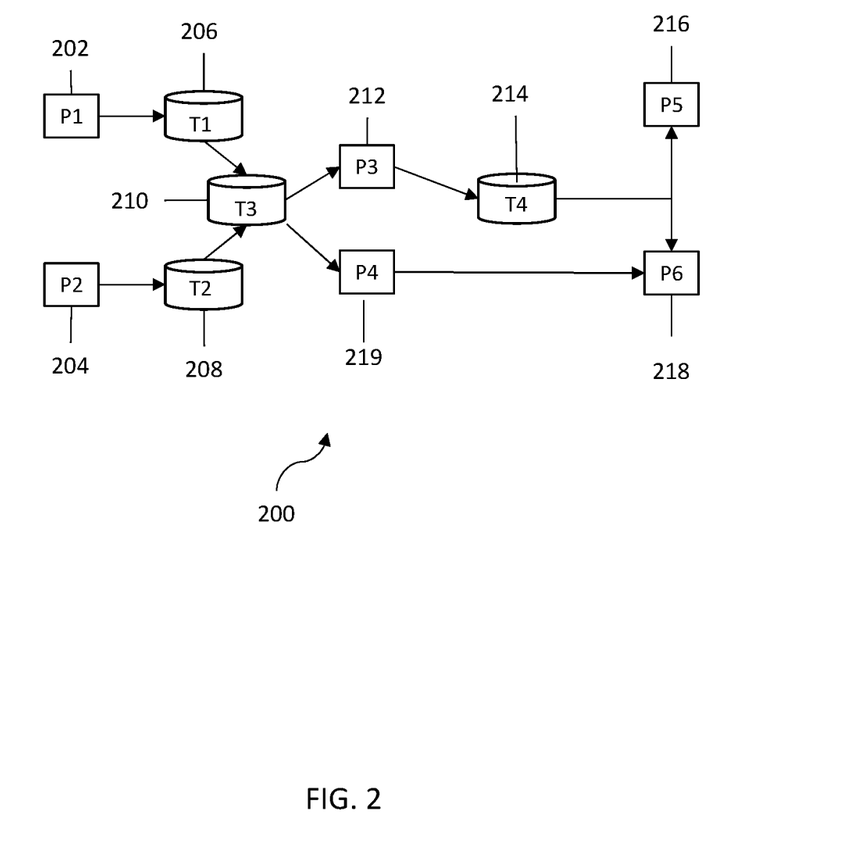
FIG. 2 illustrates an exemplary diagram of a network of oil processing plants in accordance with one or more embodiments of the present invention.

The vector $y_l \in \mathbb{R}^{n_l}$ are the outflows from processes at the l-th layer. As described above, $k_0=0$; that is, the decision variables for the first layer are only set-points. The control system 100 can find the optimal set-points xi and flow rates ($y_l$, $z_l$) to maximize processing plant production or some other target variable. The relationship between inputs and an output for an industrial plant is often complex, a non-linear prediction model should be used to capture the complexity rather than a linear model. A single-period model can be described as the nonconvex constrained optimization problem below:

$$\min_X \sum_{l=1}^{L} \phi_l(y_l) \tag{1}$$

$$\text{s.t. } y_1 = f_1(x_1),$$

$$y_l = f_l(z_{l-1}, x_l), \forall l = 2, \ldots, L,$$

$$A_l y_l + B_l z_l \le b_l, \forall l = 1, \ldots, L-1,$$

$$\underline{x}_l \le x_l \le \overline{x}_l, \forall l = 1, \ldots, L,$$

where $X=(x_1, \ldots, x_L; y_L; z_1, \ldots, z_{L-1})$, and the objective function $\Sigma_{l=1}^{L}\phi_l(y_l)$ depends on the outputs for each process. Where $\underline{x}_l$ and $\overline{x}_l$ are upper and lower bounds on control set-points. The regression model needs to be cognizant of operational domain constraints. Therefore, model parameter matrices $A_l$, $B_l$ and vector $b_l$ are used to capture interactions between nodes within two consecutive network layers (plants). One example for operational constraints to be included in $A_{ly_l}+B_{lz_l} \le b_l$ is the tank storage constraint for the fourth tank, T4, 214 (i.e., l=2), as seen in FIG. 2:

$$\underline{u}_2-u_2^0 \le y_2-z_2^1-z_2^2 \le \overline{u}_2-u_2^0, \tag{2}$$

where $u_2^0$ is the initial storage level, $\underline{u}_2$ and $\bar{u}_2$ are the lower and upper limits for storage tank T4.

The second nonconvex program for multi-period planning horizon T being described as follows:

$$\min_{X^t, u_l^t} \sum_{t=1}^{T} \sum_{l=1}^{L} \phi_l(y_l^t) \quad (3)$$

$$\text{s.t.} \quad (1-\alpha)u_l^{t-1} \leq u_l^t \leq (1+\alpha)u_l^{t-1}$$

$$(1-\beta)x_l^{t-1} \leq x_l^t \leq (1+\beta)x_l^{t-1}$$

$$u_l^t = u_l^{t-1} + y_l^t - z_l^t$$

$$\underline{u}_l \leq u_l^t \leq \bar{u}_l$$

$$X^t \in x^t,$$

$$(l = 1, \ldots, L, t = 1, \ldots, T),$$

where $x^t$ is the set of constraints for the t-the period having a form of (1), $\underline{u}_l$ and $\bar{u}_l$ are tank storage limits. The parameters $\alpha, \beta \in [0,1]$ is used to limit the amount of adjustment for a set-point from the time period t to the period t+1. The initial operating points $X^0$ and $u^0$ at time t=0 are assumed to be fixed and given, possibly from the current operation time.

Conventional non-linear optimization algorithms devoted to a nonconvex program cannot guarantee the generation of a global minimizer, and they predict based on a local minimizer rather than a global minimizer. In some industries such as the oil and gas industry, a small improvement to solution techniques can have a significant economic impact; for example, a 5% increase in control efficiency can results in billions of dollars of additional revenue for the oil and gas industry. The herein described computer-implemented methods, computing systems, and computer program products utilize a mixed-integer linear program (MILP) to obtain a globally optimal solution to the nonconvex (possibly nonsmooth) problem within a reasonable run time.

To solve optimization problems (1) and (3), the present disclosure classifies the type of prediction functions into: piece-wise linear functions such as random forest and differentiable functions such as convolutional neural networks. For piece-wise linear functions, these problems can be solved by using a mixed-integer linear program. For gradient-based functions, these problems can be solved by using a mixed-integer linear program can be solved by a nonlinear optimization algorithm.

For partition regressions based on piece-wise linear approach such decision trees, multivariate adaptive regression splines (MARS), and decision lists, nonconvex programs formulate (for example, (1) and (3)) are formulated as a respective mixed-integer linear program (MILP). The mixed-integer linear representation is used for each respective regression function $f_l$. As exemplary illustrations, a MILP model for three models: Decision tree-based ensemble models, multivariate adaptive regression splines (MARS), and feed-forward deep neural networks are shown.

A tree ensemble model combines predictions from multiple decision trees $f_t(x)$. A decision tree uses a tree-like structure to predict the outcome for an input feature vector x. The t-th regression tree in the ensemble model has the following form:

$$f_t(x) = \sum_{i=1}^{M_t} (a_{t,i}^T x + b_{t,i}) \cdot I(x \in R_{t,i}) \quad (4)$$

where $R_{t,1}, \ldots, Rt, M_t$ represent a partition of feature space, and I is the indicator function. In practice, individual decision trees often suffer from high variance predictions and can overfit the training data, which lead to a poor out-of-sample predictive accuracy, if there is no restriction in the size of tree. By using the bagging techniques, the tree ensemble regression function outputs predictions by taking the weighted sum of multiple decision trees as:

$$f(x) = \sum_{t=1}^{T} \lambda_t f_t(x), \quad (5)$$

where $\lambda_t$ is the weight for the decision tree $f_t(x)$. Parameters $a_{t,i}, b_{t,i}, R_{t,i}$ and $\lambda_t$ have been learned from the historical data.

An individual decision tree regression $y=f_t(x)$ consists of leaf nodes L and branching nodes B. For each leaf node l∈L, a linear model of the form $r_l(x)=w_l^T+c_l$ has been learned from the training data based on the points assigned to the leaf node. A branching node l∈B is represented by a hyperplane $a_l^T x+b_l$, where if $a_l^T x+b_l<0$ then the point x will follow the left branch from the node, otherwise it splits into the right branch. Since the topology of the tree is fixed, for each feature vector x, there is a unique path leading to a leaf node l∈L from the root of the tree. Let $N_L(l)$ denote the ancestor nodes of l where the left branch is followed on the path from the root to l, and let $N_R(l)$ denote the set of right branch ancestors on the path. The binary variable $e_l \in \{0,1\}$, l∈L, indicates if x is assigned to leaf node l then $e_l=1$. Exactly one leaf node is selected for a data point x, where $$\sum_{\ell \in \mathcal{L}} e_\ell = L \quad (6)$$

To determine the unique path routing to a leaf node, with the help of the indicator variable $e_l$, the following constraints are enforced for modeling the splitting at branching nodes:

$$a_k^T x + b_k \leq M_1(1-e_\ell) - \epsilon, \forall \ell \in \mathcal{L}, k \in \mathcal{N}_L(\ell)$$

$$a_k^T x + b_k \geq -M_2(1-e_\ell), \forall \ell \in \mathcal{L}, k \in \mathcal{N}_R(\ell), \quad (7)$$

Where $M_1$ and $M_2$ are big positive numbers, and a very small $\epsilon > 0$. The decision tree regression $y=f_t(x)$ can be represented as a mixed-integer bi-linear model $$y = \sum_{\ell \in \mathcal{L}} e_\ell(w_\ell^T x + e_\ell), \quad (8)$$

The bi-linear term $e_l(w_l^T+c_l)$ can be reformulated to a set of linear equations. Assume $y_l^L \leq w_l^T+c_l \leq y_l^U$ for some constants $y_l^L$ and $y_l^U$. Then $y_l=e_l(w_l^T+c_l)$ is equivalent to $$y_l^L e_l \leq y_l \leq y_l^U e_l$$

$$w_l^T x + e_l - y_l^U(1-e_l) \leq y_l \leq w_l^T x + e_l - y_l^L(1-e_l). \quad (9)$$

Based on the above, control system 100 uses the following mixed-integer linear representation for a decision tree-based model regression $y=f_t(x)$:

$$f(x) = \sum_{t=1}^{T} \lambda_t \sum_{\ell \in \mathcal{L}} y_\ell \quad (10)$$

-continued $$\text{s.t.} \sum_{\ell \in \mathcal{L}} e_\ell = 1$$

$$a_k^T x + b_k \le M_1(1-e_\ell) - e, \forall \ell \in \mathcal{L}, k \in \mathcal{N}_L(\ell)$$

$$a_k^T x + b_k \ge -M_2(1-e_\ell), \forall \ell \in \mathcal{L}, k \in \mathcal{N}_R(\ell)$$

$$y_\ell^L e_\ell \le y_\ell \le y_\ell^U e_\ell$$

$$w_\ell^T x + e_\ell - y_\ell^U(1-e_\ell) \le y_\ell \le w_\ell^T x + e_\ell - y_\ell^L(1-e_\ell)$$

$$e_\ell \in \{0,1\}, \forall \ell \in \mathcal{L},$$

For a multivariate adaptive regression spline (MARS), the control unit 100 considers the regression spine fitting of degree 1: $h(x) = \alpha_0 + \sum_{i=1}^{N} \alpha_i h_i(x)$, where $\alpha_1$ are scalars and $h_i(x) = \max\{w_i^T + c_1, 0\}$. The control unit 100 applies the following linear representation:

$$h(x) = \alpha_0 + \sum_{i=1}^{N} \alpha_i y_i \quad (11)$$

$$\text{s.t.} \quad y_i \ge w_i^T x + c_i, i = 1, \ldots, N$$

$$y_i \le (w_i^T x + c_i) + M_3 e_i, i = 1, \ldots, N$$

$$y_i \le M_4(1-e_i), i = 1, \ldots, N$$

$$e_i \in \{0,1\}, y_i \ge 0, i = 1, \ldots, N,$$

For a feed-forward deep neural network (DNN), for example a rectified linear unit (ReLU) deep neural network with K+1 layers. Indexed from 0 to K, which is used to model a non-linear function $f(x): \mathbb{R}^{n_0} \to \mathbb{R}^{n_K}$ with $n_K = 1$. For each hidden layer $1 \le k \le K-1$, the output vector $x_k$ is computed as $x_k = \sigma(W_k x_{k-1} + b_k)$, where $\sigma$ is the ReLU function, $W_k \in \mathbb{R}^{n_k \times n_{k-1}}$, $b_k \in \mathbb{R}^{n_k}$. For each layer k, assume there exists $L_k, U_k \in \mathbb{R}$ such that $L_k e_k \le W_k x_{k-1} + b_k \le U_k e_k$, $e_k = (1, \ldots, 1) \in \mathbb{R}^{n_k}$. Therefore, the MILP model for a deep neural network is:

$$x_k - s_k = W_k x_{k-1} + b_k, \quad k = 1, \ldots, K-1 \quad (12)$$

$$x_k, s_k \ge 0, \quad k = 1, \ldots, K-1$$

$$z_k \in \{0,1\}^{n_k}, \quad k = 1, \ldots, K-1$$

$$x_k \le U_k z_k, \quad k = 1, \ldots, K-1$$

$$s_k \le -L_k(1-z_k), \quad k = 1, \ldots, K-1$$

$$y = f(x_0) = W_K x_{K-1} + b_K,$$

where two new variables are introduced: $s_k \in \mathbb{R}_+^{n_k}$ and $z_k \in \{0,1\}^{n_k}$. The control unit 100 can use the same approach to have a MILP representation for other RE-type activation functions, including Leaky ReLU and Parametric ReLU.

The control unit 100 can further utilize a model to determine whether additional materials are needed to be added or removed for a process. For a regression function in the form y=f(x), the i-th material commitment is as follows:

$$x_i \in [l, u] \text{ or } x_i = 0 \quad (13)$$

For some upper bound u and some lower bound l. The condition can be modeled as:

$$l * s \le x_i \le u * s \quad (14)$$

$$t - u(1-s) \le x_i \le t - l(1-s)$$

$$l \le t \le u$$

$$s \in \{0,1\}$$

These equations can be added to a MLIP model. The control unit 100 can then cause a physical material to be added or removed from a process based on the solution.

The control unit 100 can further determine whether a process needs to be enabled or disabled. For a process commitment either y=f(x) or y=0. The control unit 100 assumes that the capacity of a process when operating is $a \le f(x) \le b$. The following equations are then added to the model a plant's status:

$$a * v \le y \le b * v \quad (15)$$

$$f(x) - b(1-v) \le y \le f(x) - a(1-v)$$

$$a \le f(x) \le b$$

$$v \in \{0,1\}$$

The control unit 100 can then solve for the MILP model to determine whether a process should be enabled or disabled.

The control system 100 can solve for the set variable and flow variable based on applying a mixed-integer linear program, when the predictive models are piece-wise linear functions such as random forest, multivariate adaptive regression splines and fully connected feed-forward network.

In the event that the sub-control system is applying a non-linear predictive model, the control system 100 can apply the following primal-dual optimization algorithm. The control system 100 can solve the above referenced model by a two-level augmented Lagrangian method when gradients of $f_l$ are available. The control system 100 can treat non-linear local constraints $y_l = f_l(\bullet)$ and the linear coupling constraints $A_{lyl} + B_{lzl} \le b_l$ differently. The control system 100 applies an augmented Lagrangian method to non-linear coupling constraints in the outer loop. The control system 100 applies a multi-block alternating direction method of multipliers (ADMM) to the linear coupling constraints at the inner level.

In order to apply a multi-block ADMM to a single period-model, the control system 100 adds a slack variable $u_l$ for the linear constraint, such that $$A_{lyl} + B_{lzl} + v_l - b_l + u_l = 0; \text{ and } u_l = 0. \quad (16)$$

The control system 100 then solves the optimization problem using an augmented Lagrangian method with both constraints, $y_l = f_l(\bullet)$ and $u_l = 0$ by the following algorithm. First, the control unit 100 can consider the following sub-problem in the augmented Lagrangian method $$\min F(\hat{u}, \hat{v}, \hat{x}, \hat{y}, \hat{z}, \hat{\lambda}^k, \hat{v}^k; \beta^k, \gamma^k) = \phi(y_L) + \quad (17)$$

$$(\lambda_1^k)^T (y_1 - f_1(x_1)) + \frac{\beta^k}{2} \|y_1 - f_1(x_1)\|^2 + \sum_{l=2}^{L} (\lambda_l^k)^T (y_l - f_l(z_{l-1}, x_l)) +$$

-continued $$\frac{\beta^k}{2}\sum_{l=2}^{L}\|y_l - f_l(z_{l-1}, x_l))\|^2 + \sum_{l=1}^{L-1}(v_l^k)^T u_l + \frac{\gamma^k}{2}\sum_{l=1}^{L-1}\|u_l\|^2$$

s.t. $A_l y_l + B_l z_l + v_l - b_l + u_l = 0, \forall l = 1, \ldots, L-1,$ $\underline{x}_l \leq x_l \leq \overline{x}_l, \underline{y}_l \leq y_l \leq \overline{y}_l, \forall l = 1, \ldots, L,$ $\underline{z}_l \leq z_l \leq \overline{z}_l, v_l \geq 0, \forall l = 1, \ldots, L-1.$ The augmented Lagrangian method is provided below where $h(\hat{x}, \hat{y}, \hat{z}) = [y_1 - f_1(y_1), y_2 - f_2(z_1, y_2), \ldots y_L - f_L(z_{L-1}, y_L)].$

---

ALGORITHM 1: Two-level ALM

1: Initialize starting points $(\hat{u}^0, \hat{v}^0, \hat{x}^0, \hat{y}^0, \hat{z}^0);$
   $\beta^1, \gamma^1 > 0, \omega \in (0, 1), r > 1;$ index $k \leftarrow 1;$
2: while some stopping criterion is not satisfed do
3:   /* Inner level problem */
4:   Solve (20) by a multi-block ADMM to get
      $(\hat{u}^k, \hat{v}^k, \hat{x}^k, \hat{y}^k, \hat{z}^k, \mu^k)$ for $(\hat{\lambda}^k, \beta^k)$ and $(\hat{v}^k, \gamma^k);$
5:   if $\|h(\hat{x}^k, \hat{y}^k, \hat{z}^k)\| \leq \omega \|h(\hat{x}^{k-1}, \hat{y}^{k-1}, \hat{z}^{k-1})\|$ then
6:     $\hat{\lambda}^{k+1} \leftarrow \hat{\lambda}^k + \beta^k h(\hat{x}^k, \hat{y}^k, \hat{z}^k), \beta^{k+1} \leftarrow \beta^k;$
7:   else
8:     $\hat{\lambda}^{k+1} \leftarrow \hat{\lambda}^k, \beta^{k+1} \leftarrow r\beta^k;$
9:   end if
10:  if $\|\hat{u}^k\| \leq \omega \|\overline{u}^{k-1}\|$ then
11:    $\hat{v}^{k+1} \leftarrow \hat{v}^k + \gamma^k \hat{u}^k, \gamma^{k+1} \leftarrow \gamma^k;$
12:  else
13:    $\hat{v}^{k+1} \leftarrow \hat{v}^k, \gamma^{k+1} \leftarrow r\gamma^k;$
14:  end if
15:  $k \leftarrow k - 1;$
16: end while (18)

---

The theoretical convergence results for the two-level augmented Lagrangian method when combining with a multi-block ADMM can be seen as follows. The first assumption is that $F(\hat{u},\hat{v},\hat{x},\hat{y},\hat{z},\hat{\lambda}^k,\hat{v}^k,\beta^k,\gamma^k)$ is continuously differentiable. The second assumption is that the inner level ADMM outputs an approximate solution $\{(\hat{u}^k, v^k, \hat{x}^k, \hat{y}^k, \hat{z}^k, \hat{u}^k)\}$ to the following conditions $$d_1^k \in \nabla f(\hat{x}^k, \hat{y}^k, \hat{z}^k) + \nabla h(\hat{x}^k, \hat{y}^k, \hat{z}^k)^T (\overline{\lambda}^k + \beta^k h(\hat{x}^k, \hat{y}^k, \hat{z}^k)) + \quad (19)$$

$$N_X(\hat{x}^k, \hat{y}^k, \hat{z}^k) + C^T \mu^k, d_2^k \in \mu^k + N_{\hat{x}}(\hat{v}^k),$$

$$A\hat{y}^k + B\hat{z}^k + \hat{v}^k - b + \hat{u}^k = d_3^k, \hat{v}^k + \gamma^k \hat{u}^k + \mu^k = 0,$$

Where $$\lim_{k\to\infty}\|d_i^k\|=0 \text{ for } i=1,2,3, f(\hat{x},\hat{y},\hat{z})=\varphi(y_L) \quad (20)$$

Also where C=[0 A B], which is a matrix associated with $(\hat{x}, \hat{y}, \hat{z})$ in the linear constraint. X and $\overline{X}$ are the box constraints for $(\hat{x}, \hat{y}, \hat{z})$ and $\hat{v}$, respectively.

For the last block of inner level ADMM, the linear constraint related to û is an identity matrix and the objective function is a convex and quadratic function. Under mild conditions on the functions f, h and the matrices A, B, the multi-block ADMM algorithm can converge (subsequently) to a stationary point of the subproblem (17) and therefore the second Assumption can be satisfied.

The multi-period formulation (3) can be compactly expressed as follows:

$$\min_{w^1,\ldots,w^T}\sum_{t=1}^{T}\phi^t(w^t) \quad (21)$$

-continued s.t. $w^t \in \Omega^t, t = 1, \ldots, T$ $M^{t-1}w^{t-1} + N^t w^t + c^t = 0,$ where w=(X, u, p, q, r, s) and the constraint set $\Omega^t$ is related to $X^t$, bounds for u, and positivity constraints for p, q, r, and s. The parameters $M^t$, $N^t$, and $c^t$ are determined from the coupling constraints.

The phrases "neural network" and "machine learning" broadly describes a function of electronic systems that learn from data. A machine learning system, engine, or module can include a machine learning algorithm that can be trained, such as in an external cloud environment (e.g., a cloud computing environment), to learn functional relations between inputs and outputs that are currently unknown. In one or more embodiments, machine learning functionality can be implemented using a predictive model, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The predictive model can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the predictive model that carry electronic messages between simulated neurons are provided with numeric weights that correspond to the strength or weakness of a given connection. During training, the weights can be adjusted and tuned based on experience, making the control system 100 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Referring to FIG. 2, an exemplary diagram 200 of a network of oil processing plants in accordance with one or more embodiments of the present invention is shown. In connection with FIG. 2, optimization can involve devising production strategies that maximize synthetic crude oil (SCO) production, under both normal operations as well as unplanned upsets and breakdowns. Starting with mined oil sands, the first step is to extract bitumen as froth and store it in a storage tank. The first plant, P1, 202 and the second plant, P2, 202 are two parallel froth and diluted bitumen production plants. The first tank, T1, 206 and the second tank, T2, 208 are intermediate storage tanks. The third tank, T3, 210 stores diluted bitumen. The diluted bitumen is passed through an upgrading third plant, P3, 212, to produce low-quality SCO that gets stored in a fourth tank, T5, 214. This is an intermediate product that is either sold directly to refineries or is further processed in a fourth plant, P5, 216 and a fifth plant, P6, 218 that are parallel upgraders that produce different grades of synthetic crude oil.

Each of the first, second, third, fourth, and fifth plants 202, 204, 212, 216, 218 are controlled by a sub-control system. Each sub-control system employs a respective predictive model to calculate predicted throughputs at each respective plant. The predictive models can each be a same type of predictive model or at least one of the first, second, third, fourth, and fifth plants 202, 204, 212, 216, 218 can employ a different type of predictive model.

Referring to FIG. 3, an exemplary network representation 300 of processing plants described in FIG. 2 in accordance with one or more embodiments of the present invention is shown. The representation 300 is viewed as a hierarchal structure with L layers having upstream-downstream operation relations. The first node 302, second node 304, third node 306, fourth node 308, and fifth node 310 represent a respective plant (i.e., a sub-system) from FIG. 2, where a predictive model is built. The first rectangular node 312 and the second rectangular node 314 represents all the operational constraints, such as maintaining inventory levels and limits on the adjustment of variables from the preceding time period. The relationship in these rectangular nodes 312 314 are often linear. In some embodiments of the present invention, these rectangular nodes 312 314 represent a volume of fluid in one or more storage tanks. It should be appreciated that FIGS. 2 and 3 only illustrate one particular arrangement of a network of plants, however, the herein described computer-implemented methods, computing systems, and computer programs products are applicable to any number of network arrangements.

Figure 4:
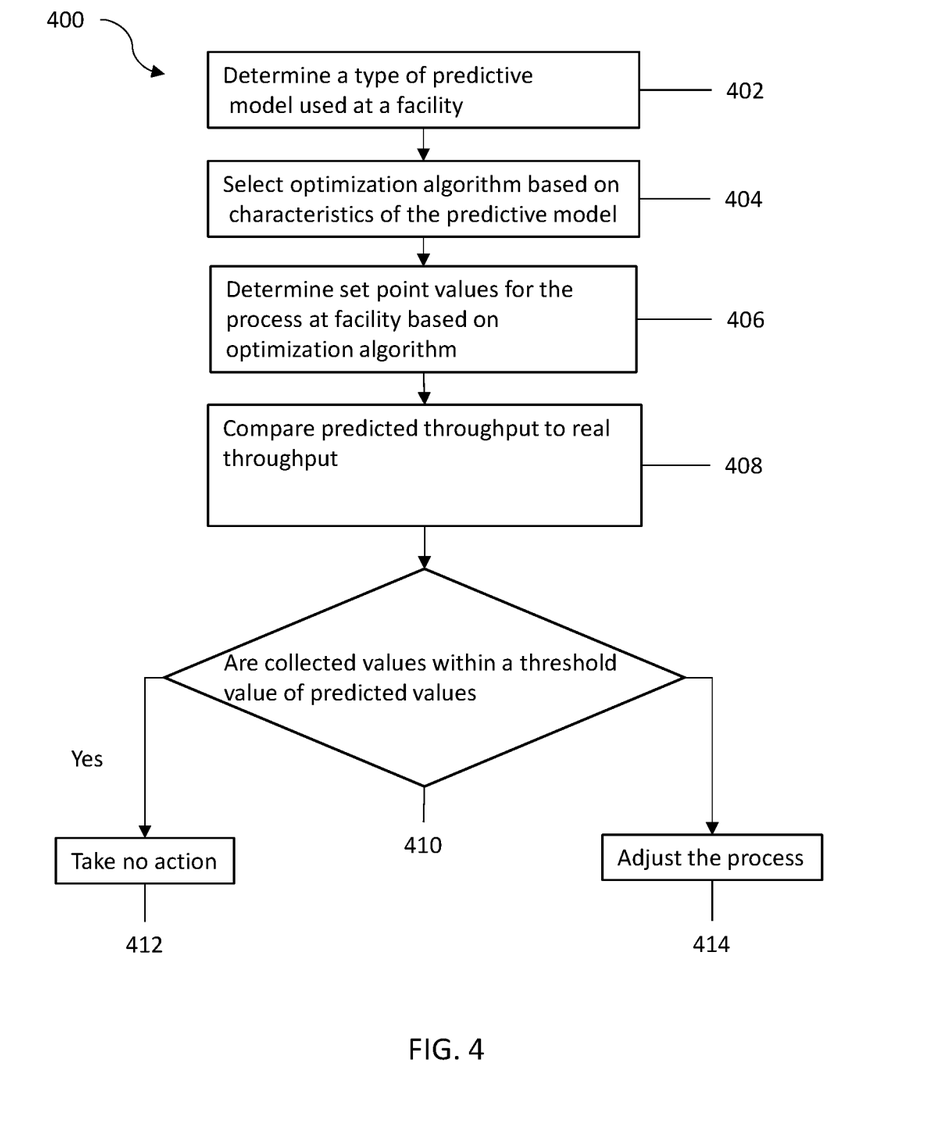
FIG. 4 illustrates a flow diagram of a process for optimizing a manufacturing and process control system in accordance with one or more embodiments of the present invention.

Referring to FIG. 4, a computer-implemented process 400 for optimizing a manufacturing and process control system in accordance with one or more embodiments of the present invention is shown. In accordance with embodiments of the invention, the process 400 is implemented by the control system 100. At block 402, the control system 100 determines a type of predictive model used by a sub-control system of a plant of a network of plants. The network of plants being arranged for the purposes of completing separate processing stages of one or more products. The predictive model can be a linear-based predictive model or a non-linear-based predictive model. The control system 100 can determine the type of predictive model by accessing the sub-control system and analyzing the predictive model. The control system 100 can also access a network database with a description of each predictive model used at each plant of a network of plants.

At block 404, the control system 100 selects an optimization algorithm based on the type of predictive model used by the sub-control system of the plant. Regardless of type of predictive model, the control system 100 used the selected optimization algorithm to solve a model of the plant to determine optimal set variables and outflow values at the plant. In the event that the plant uses a linear-based predictive model, the control system 100 uses a mixed-integer linear program to solve for the optimization. If the plant uses a non-linear-based predictive model, the control system takes into account both linear and non-linear constraints and solves the optimization through an augmented Lagrangian method.

At block 406, the control system 100 solves for the optimum values for the set-points and outflow values. As described above, the control system 100 uses a mixed-integer linear program to solve for the optimization of a linear model. Alternatively, the control system 100 uses an augmented Lagrangian method to solve the optimization of a non-linear predictive model.

At block 408, the control system 100 applies the optimum set-points and outflow values to determine and optimum throughput value for the plant. The control system 100 further receives actual throughput values from sensors arranged on or about the plant. The sensor values can include a volume, quality, or time of processing of fluid processed by the plant. The control system 100 further compares the measured throughput to the predicted throughput.

At block 410, the control system 100 determines whether the measured throughput values are within a threshold value of the predicted threshold value. The threshold value can include an upper bound and a lower bound. The control system 100 can further determine whether the measured value is within the upper bound and the lower bound. At block 412, if the measured value is within the upper bound and the lower bound, the control system 100 takes no further action. However, if the measured value is not within the upper bound and lower bound, the control system 100 can suspend one or more processes at the plant. The control system 100 can cause an actuator at the plant to cease to function, thereby suspending the process.

Figure 5:
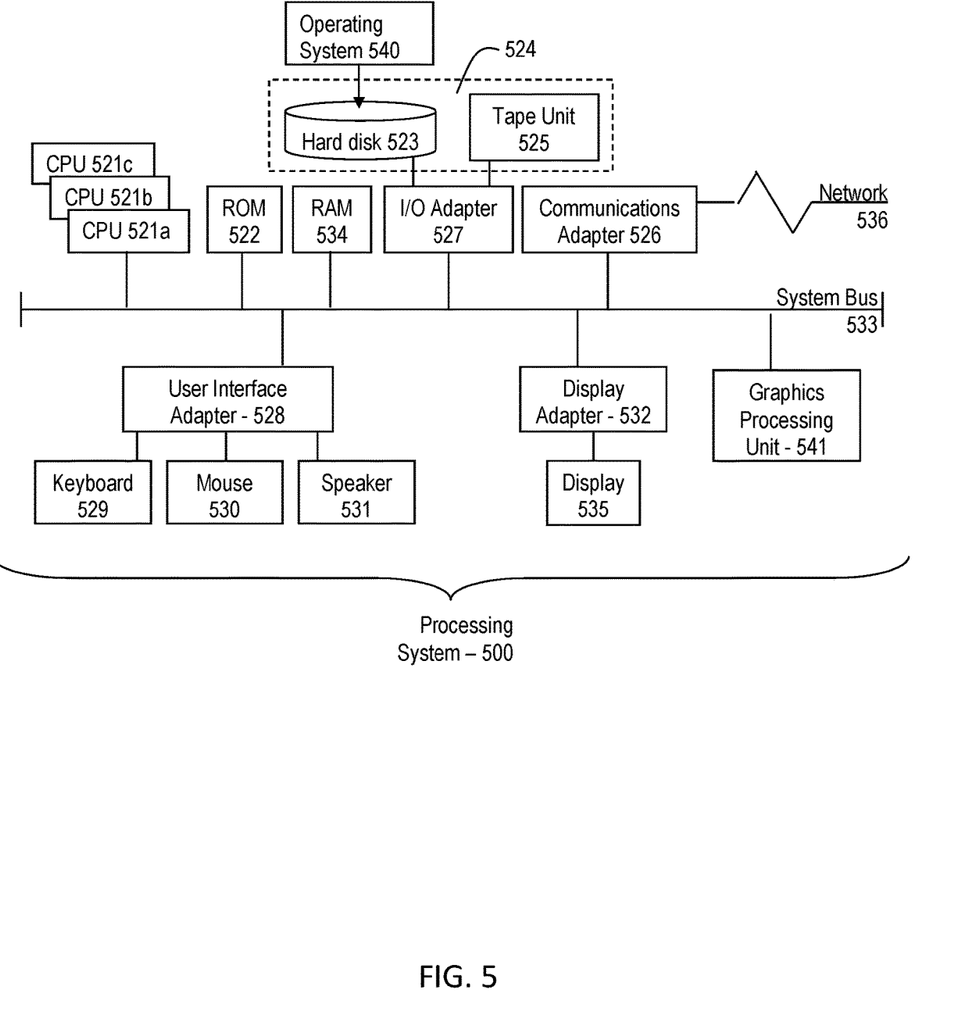
FIG. 5 illustrates a block diagram of a computer system for use in implementing one or more embodiments of the present invention.

It is understood that the present disclosure is capable of being implemented in conjunction with any other type of computing environment now known or later developed. For example, FIG. 5 depicts a block diagram of a processing system 500 for implementing the techniques described herein. In examples, the processing system 500 has one or more central processing units (processors) 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of the processing system 500.

Further depicted are an input/output (I/O) adapter 527 and a network adapter 526 coupled to the system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display (e.g., a display monitor) 535 is connected to the system bus 533 by display adapter 532, which may include a graphics adapter to improve the performance of graphics intensive applications and a video control. In one aspect of the present disclosure, adapters 526, 527, and/or 532 may be connected to one or more I/O busses that are connected to the system bus 533 via an intermediate bus bridge (not shown). Suitable I/O buses for connecting peripheral devices such as hard disk controls, network adapters, and graphics adapters typically include common protocols, such as the Peripheral Component Interconnect (PCI). Additional input/output devices are shown as connected to system bus 533 via user interface adapter 528 and display adapter 532. An input device 529 (e.g., a keyboard, a microphone, a touchscreen, etc.), an input pointer 530 (e.g., a mouse, trackpad, touchscreen, etc.), and/or a speaker 531 may be interconnected to system bus 533 via user interface adapter 528, which may include, for example, a Super I/O chip integrating multiple device adapters into a single integrated circuit.

In some aspects of the present disclosure, the processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, the processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 724) and mass storage 534 collectively store the operating system 540 to coordinate the functions of the various components shown in the processing system 500.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
applying, by a processor, an optimization algorithm to a control system of a processing plant based on whether the control system is guided by a linear-based predictive model or a non-linear-based predictive model in which a gradient is available, wherein applying the optimization algorithm comprises:
responsive to the control system being guided by a linear-based predictive model, applying a mixed-integer linear program to the linear-based predictive model, wherein the mixed-integer linear program comprises one or more individual decision trees, wherein a topology of each decision tree is fixed such that, for each feature vector x in the respective decision tree, there is a unique path leading to a leaf node of the tree from the root of the tree; and
responsive to the control system being guided by a non-linear-based predictive model, applying a two-level augmented Lagrangian method to the non-linear-based predictive model, wherein an augmented Lagrangian method is applied to non-linear coupling constraints in an outer level of the two-level augmented Lagrangian method and a multi-block alternating direction method of multipliers (ADMM) is applied to linear coupling constraints in an inner level of the two-level augmented Lagrangian method;
calculating, by the processor, a set variable using the optimization algorithm;
predicting, by the processor, an output based on the calculated set variable;
comparing, by the processor, an actual output at the processing plant to the predicted output; and
suspending, by the processor, a physical process at the processing plant in response to the actual output being a threshold value apart from the predicted output.

2. The computer-implemented method of claim 1, wherein calculation of the set variable is based at least in part on a measured volume of fluid processed by a predecessor processing plant.

3. The computer-implemented method of claim 1, wherein the suspending a physical process comprises disabling an actuator.

4. The computer-implemented method of claim 1, wherein the non-linear based model includes a deep neural network (DNN).

5. The computer-implemented method of claim 1, wherein the processing plant is member of a network of processing plants.

6. A system comprising:
a memory having computer readable instructions; and
one or more processors configured to execute the computer readable instructions, the computer readable instructions configured to control the one or more processors to perform operations comprising:
applying an optimization algorithm to a control system of a processing plant based on whether the control system is guided by a linear-based predictive model or a non-linear-based predictive model in which a gradient is available, wherein applying the optimization algorithm comprises:
responsive to the control system being guided by a linear-based predictive model, applying a mixed-integer linear program to the linear-based predictive model, wherein the mixed-integer linear program comprises one or more individual decision trees, wherein a topology of each decision tree is fixed such that, for each feature vector x in the respective decision tree, there is a unique path leading to a leaf node of the tree from the root of the tree; and
responsive to the control system being guided by a non-linear-based predictive model, applying a two-level augmented Lagrangian method to the non-linear-based predictive model, wherein an augmented Lagrangian method is applied to non-linear coupling constraints in an outer level of the two-level augmented Lagrangian method and a multi-block alternating direction method of multipliers (ADMM) is applied to linear coupling constraints in an inner level of the two-level augmented Lagrangian method;
calculating a set variable using the optimization algorithm;
predicting an output based on the calculated set variable;
comparing an actual output at the processing plant to the predicted output; and
suspending a physical process at the processing plant in response to the actual output being a threshold value apart from the predicted output.

7. The system of claim 6, wherein calculation of the set variable is based at least in part on a measured volume of fluid processed by a predecessor processing plant.

8. The system of claim 6, wherein the suspending a physical process comprises disabling an actuator.

9. The system of claim 6, wherein the non-linear based model includes a deep neural network (DNN).

10. The system of claim 6, wherein the processing plant is member of a network of processing plants.

11. A non-transitory computer program product comprising a computer readable storage medium having program instructions embodied therewith, the program instructions executable by a processor to cause the processor to perform operations comprising:
applying an optimization algorithm to a control system of a processing plant based on whether the control system is guided by a linear-based predictive model or a non-linear-based predictive model in which a gradient is available, wherein applying the optimization algorithm comprises:
responsive to the control system being guided by a linear-based predictive model, applying a mixed-integer linear program to the linear-based predictive model, wherein the mixed-integer linear program comprises one or more individual decision trees, wherein a topology of each decision tree is fixed such that, for each feature vector x in the respective decision tree, there is a unique path leading to a leaf node of the tree from the root of the tree; and
responsive to the control system being guided by a non-linear-based predictive model, applying a two-level augmented Lagrangian method to the non-linear-based predictive model, wherein an augmented Lagrangian method is applied to non-linear coupling constraints in an outer level of the two-level augmented Lagrangian method and a multi-block alternating direction method of multipliers (ADMM) is applied to linear coupling constraints in an inner level of the two-level augmented Lagrangian method;
calculating a set variable using the optimization algorithm;

predicting an output based on the calculated set variable;

comparing an actual output at the processing plant to the predicted output; and suspending a physical process at the processing plant in response to the actual output being a threshold value apart from the predicted output.

12. The computer program product of claim 11, wherein calculation of the set variable is based at least in part on a measured volume of fluid processed by a predecessor processing plant.

13. The computer program product of claim 11, wherein the suspending a physical process comprises disabling an actuator.

14. The computer program product of claim 11, wherein the non-linear based model includes a deep neural network (DNN).

* * * * *